Oct. 13, 1925.

F. C. DOODY 1,556,768

SELF ADJUSTING BEARING

Filed Oct. 13, 1923

Inventor

Frederick C. Doody

By Watson E. Coleman

Attorney

Patented Oct. 13, 1925.

1,556,768

UNITED STATES PATENT OFFICE.

FREDERICK C. DOODY, OF ST. ONGE, SOUTH DAKOTA.

SELF-ADJUSTING BEARING.

Application filed October 13, 1923. Serial No. 668,312.

*To all whom it may concern:*

Be it known that I, FREDERICK C. DOODY, a citizen of the United States, residing at St. Onge, in the county of Lawrence and State of South Dakota, have invented certain new and useful Improvements in Self-Adjusting Bearings, of which the following is a specification, reference being had to the accompanying drawings.

This invention relates to bearings for rotating shafts and has for its object the provision of a novel bearing structure which is self-adjusting so as to automatically take up wear and prevent play, the bearing being capable of use in connection with any shaft but being designed primarily for use in connecting rod bearings for the engines of automobiles, there being, however, no limitation as to the capacity in which the structure is employed.

An important and more specific object is the provision of a bearing structure which is equipped with spring pressed wedge means tending always to force the bearing cap or movable section toward the body or relatively stationary section, the wedge means moreover acting to lock the securing nuts against unscrewing without resorting to the usual method of wiring the nuts or equipping them with cotter pins in the event that the nuts are of the castellated type.

An additional object is the provision of a bearing of this character which will be simple and inexpensive in manufacture, easy to apply, positive in action, efficient in service and a general improvement in the art.

With the above and other objects and advantages in view, the invention consists in the details of construction and arrangement of parts to be hereinafter more fully described and claimed, and illustrated in the accompanying drawing in which:

Figure 1:
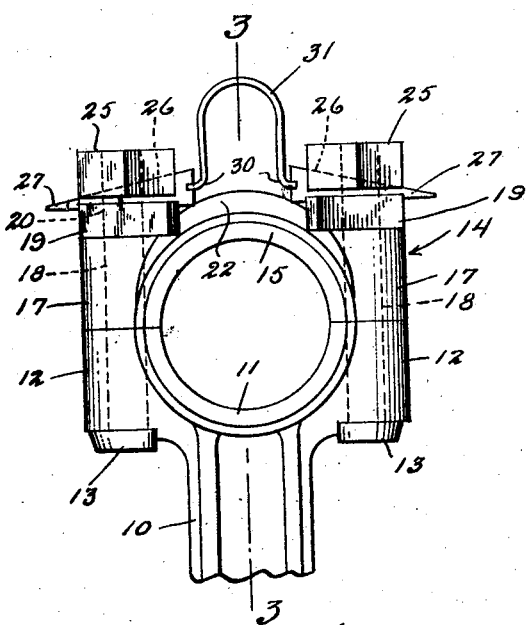
Figure 1 is a side elevation of the bearing.
Figure 3:
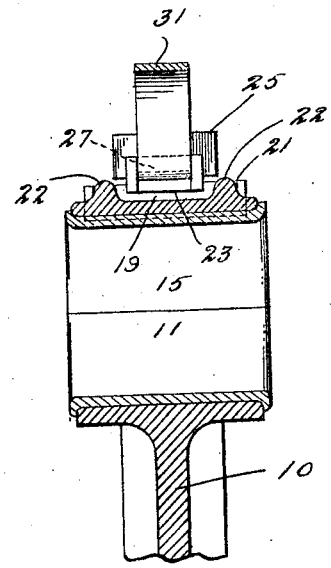
Figure 3 is a longitudinal section.
Figure 2:
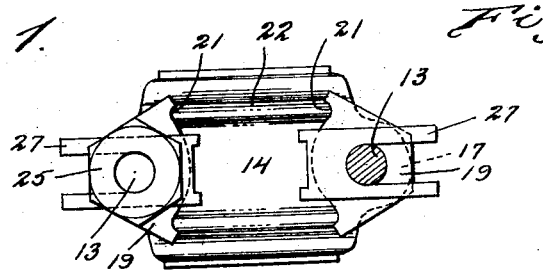
Figure 2 is an end view.
Figure 4:
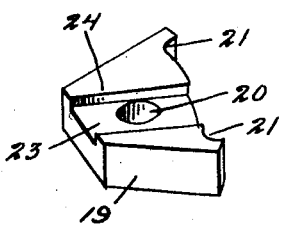
Figure 4 is a perspective view of one of the plate members.
Figure 6:
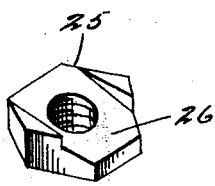
Figure 6 is a perspective view of one of the nuts.
Figure 5:
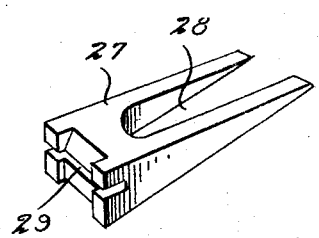
Figure 5 is a perspective view of one of the wedge members.

Referring more particularly to the drawings, I have illustrated the invention as applied to a connecting rod including the usual body 10 formed at one end with a semi-cylindrical bearing portion 11 at opposite sides of which are ears 12 through which pass bolts 13. Associated with the body is the cap 14 formed with a semi-cylindrical bearing portion 15 mating with the portion 11 for engagement upon a rotary shaft. The cap 14 is likewise provided with ears 17 having bores 18 through which the bolts 13 are slidably passed. Ordinarily in bearings of this structure the cap is held in place by nuts screwed onto the bolts and wired together or else held by cotter pins. Furthermore, in the ordinary type of bearing shims are provided between the body and the cap and in case of looseness caused by wear the shims must be removed, subsequently to which the nuts are tightened to draw up the cap on the shaft.

In carrying out my invention, I provide a pair of plate members 19 formed with holes 20 and engaged upon the projecting ends of the bolts 13. These plate members are substantially trapezoidal shaped though they might be of some other configuration and they have their confronting edges notched at 21 for the accommodation of the ribs 22 which are near the edges of the cap. The faces of these plates farthest from the cap are grooved at 23 to define guide flanges 24.

Instead of using the nuts ordinarily provided on bearings of this type, I make use of nuts 25 which have their faces toward the bearing cap cut to define grooves 26. These nuts are screwed onto the bolts 13 and turned down sufficiently that the deeper ends of the grooves will face toward each other. It is to be noted that these grooves are inclined, one end merging into the face of the nut. When the nuts are properly disposed the grooves 26 therein register with the grooves 23 in the plates 19.

The adjusting means consists of wedges 27 of a size to fit slidably within the registering grooves 23 and 26 and these wedges are forked at 28 so as to straddle the bolts 13. The wedges are arranged with their thicker ends toward each other and these thicker ends are formed with transverse slots 29 within which are engaged the outturned ends 30 of a U-shaped spring 31.

In assembling the parts, the cap 14 is engaged upon the bolts 13, the plates 19 are engaged upon the bolts and the nuts are applied and screwed down into engagement with the plates and with the deeper ends of the slots therein disposed adjacent each other. The wedges 27 are then inserted and forced outwardly and the spring 31 is engaged with the slots 29 in the wedges. When in the course of time the bearing wears, it is obvious that the outward pressure exerted by the arms of the spring 31 will slide the wedges 27 outwardly and these wedges bearing against the nuts will force the cap toward the body of the bearing and consequently take up the wear and prevent looseness. This action is entirely automatic so that the bearing will need no manual adjustment after once being installed. Another distinct feature of advantage is that the wedges fitting within the grooves in the plates and nuts will act to lock the nuts against rotation so that they cannot possibly become unscrewed. This is a big improvement over the usual wiring or cottering methods of holding the nuts.

From the foregoing description and a study of the drawings, it is apparent that I have thus provided a simple and inexpensive bearing structure which is self-adjusting. As a matter of fact, the elements constituting my invention may be manufactured and sold as an attachment capable of use on already existing bearings so that it will be unnecessary to build a specially designed bearing.

While I have shown and described the preferred embodiment of the invention, it is to be understood that I reserve the right to make all such changes in the details of construction and arrangements of parts as will not depart from the spirit of the invention or the scope of the claims.

I claim:—

1. The combination with a bearing including a relatively stationary body and a mating movable and removable cap held thereto by bolts passing through the body and cap in parallel relation to the longitudinal axis of the body, of automatic adjusting means comprising plate members disposed against the outer side of the cap and apertured for engagement upon the bolts, said plates cooperating with portions of the cap whereby to be incapable of rotary movement with respect thereto, said plates being formed with grooves, nuts threaded onto the bolts and having their faces toward the plates formed with grooves registering with said first named grooves, the grooves in the nuts increasing in depth toward the confronting edges of the nuts, wedges forked for straddling engagement upon the bolts and slidably engaged within the registering grooves, the wedges having their thicker ends disposed toward each other, and a spring interposed between and urging said wedges outwardly.

2. In combination with a bearing including a relatively stationary body portion and a removable cap held to the body by bolts, adjusting means comprising plate members engaged upon the bolts and lying against the cap, nuts screwed onto the bolts and replacing the usual nuts, said nuts being formed with inclined grooves in their faces toward said plates, wedge members engaged within said grooves, and spring means urging said wedge members outwardly.

3. The combination with a bearing including a body and a cap held thereto by bolts, of adjusting means comprising plates engaged upon the bolts and bearing upon the cap, nuts screwed onto the bolts and having their faces toward the plates formed with inclined grooves, wedges engaged within said grooves and forked for straddling engagement with the bolts, and a spring engaged between said wedges for constantly urging them outwardly.

4. Automatic adjusting means for a bearing structure including a body and a cap held thereto by bolts, comprising plates engaged upon said bolts and formed with grooves in their outer faces, nuts screwed onto said bolts and having their faces toward said plates formed with inclined grooves registering with said first named grooves, forked wedges engaged within the registering grooves and straddling the bolts, and means constantly urging said wedges away from each other.

In testimony whereof I hereunto affix my signature.

FREDERICK C. DOODY.